(12) United States Patent
Loh

(10) Patent No.: US 8,097,841 B2
(45) Date of Patent: Jan. 17, 2012

(54) CONVERSION CIRCUIT FOR CONVERTING DATA OF SIGNAL LINE BETWEEN AN AIR-CONDITIONER AND A COMPUTER

(75) Inventor: Keen Yong Walter Loh, Selangor Darul Ehsan (MY)

(73) Assignee: OYL Research and Development Centre Sdn. Bhd., Sg. Buloh, Selangor Darul Ehsan ( * ) Notice: Subject to any disclaimer, the term of this patent is extended or adjusted under 35 U.S.C. 154(b) by 981 days.

(21) Appl. No.: 12/045,983

(22) Filed: Mar. 11, 2008
(Under 37 CFR 1.47)

(65) Prior Publication Data
US 2009/0175624 A1    Jul. 9, 2009

(30) Foreign Application Priority Data

Mar. 12, 2007 (MY) ................................ PI 20070384

(51) Int. Cl.
*H01J 40/14* (2006.01)
(52) U.S. Cl. ..................................... 250/214 R; 250/221
(58) Field of Classification Search ............... 250/214 R, 250/221, 551; 341/51, 52, 61–64, 176; 398/116; 307/18–24; 363/21.01–21.13
See application file for complete search history.

(56) References Cited

U.S. PATENT DOCUMENTS
4,497,031 A * 1/1985 Froehling et al. ............. 700/276
* cited by examiner

*Primary Examiner* — Que T Le
(74) *Attorney, Agent, or Firm* — Fish & Richardson P.C.

(57) ABSTRACT

A circuit for converting data of a signal line in the form of logical pulses of current to RS232 level voltages between an air-conditioner and a computer is described. The conversion circuit is able to troubleshoot the communication signals between the indoor unit and outdoor unit of an air-conditioner.

13 Claims, 3 Drawing Sheets

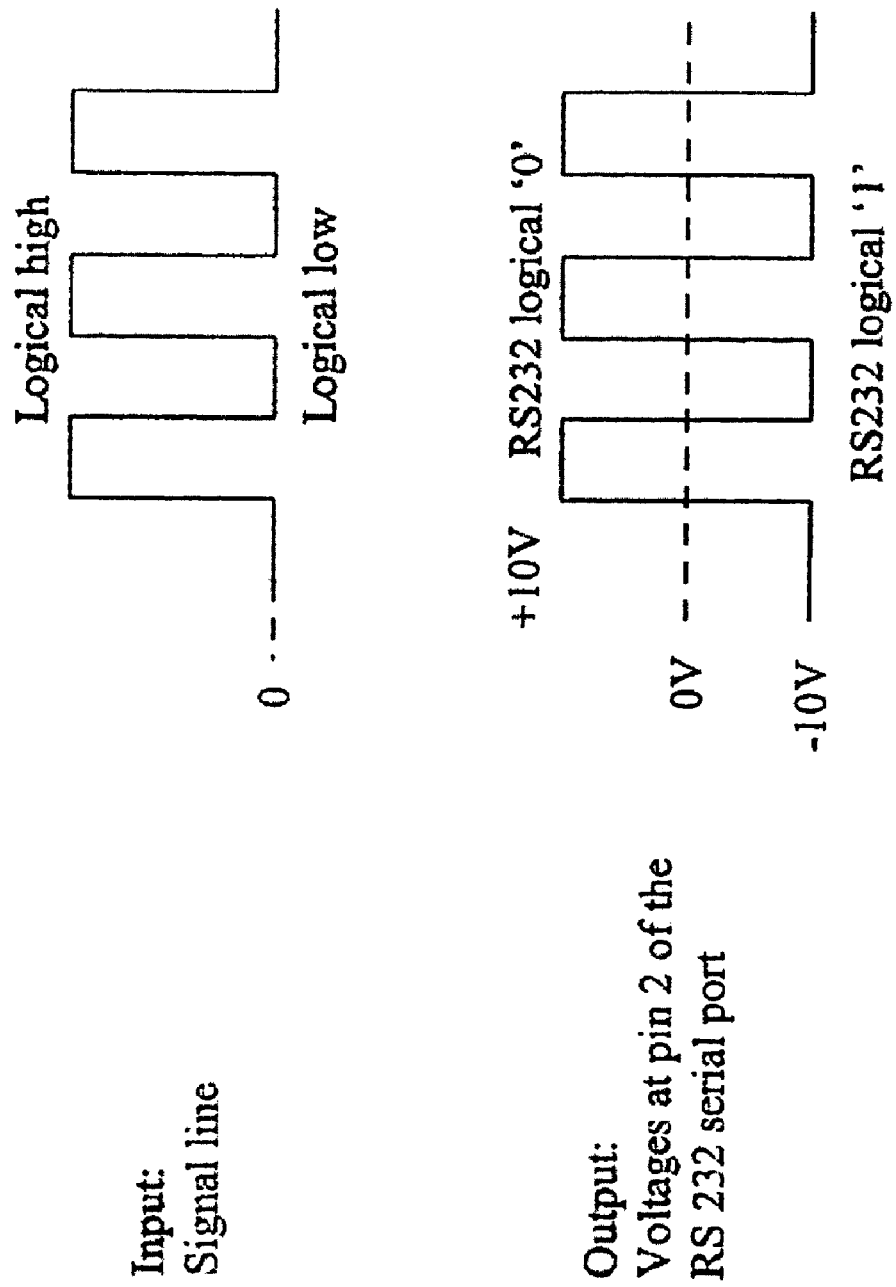

CONVERSION CIRCUIT FOR CONVERTING DATA OF SIGNAL LINE BETWEEN AN AIR-CONDITIONER AND A COMPUTER

FIELD

A conversion circuit of the communication signals from an air-conditioner to RS 232 level voltages for inputting to a computer.

BACKGROUND

Microcontrollers control and monitor the overall operation of the air-conditioning system. By using a serial communication circuit to relay vital information to one another, microcontrollers are able to make the necessary decisions concerning the process being controlled. When a glitch occurs in the system, the communication signals exchange between the indoor unit and outdoor unit can be intercepted for diagnosis. By means of a data logger, the intercepted data can be recorded and viewed at a later time. Computer based data logging systems can be used for this purpose. It is common for a serial port or RS232 port of the computer to be used for receiving data. For the purpose of relaying the data transmitted by the air-conditioning system to the computer, an RS 232 converter circuit is required.

Generally, an RS232 transceiver integrated circuit such as the MAX232 and an opto-coupler can be used to perform the RS232 conversions as shown in FIG. 1. The opto-coupler first converts the logical pulses of current of the signal line to Transistor-Transistor Logic (TL) signals. The RS 232 transceiver integrated Circuit (IC) in turn, converts the TL voltage levels to RS 232 level voltages, which are then fed into the serial port of the computer. The transceiver IC uses charge pump circuits to step up the voltage in order to generate the RS 232 level signals from the TTL signals. These charge pump circuits however, require external capacitors to multiply the voltage. Usually, four capacitors with values between 0.1 pF to 1 pF need to be added externally to the transceiver IC in order for it to operate properly. The use of external capacitors will take up space on the printed circuit board. In addition to that, the transceiver IC also requires a stable external power supply typically in the region +5V for operation.

The Electronic Industries Alliance (EIA) standard RS 232 requires a receiver to distinguish between voltages as low as +3V and −3V, where positive level voltages are defined as logic '0' whereas negative level voltages are defined as logic '1'. Typically, the positive level voltages can be in the range from +5V to +12V while the negative level voltage ranges from −5V to −12V, depending on the hardware. The large voltage swing between positive and negative is intended to make the transmission of data signals less susceptible to electrical noise.

It is an object of the circuits described herein to convert the data signal line from the air-conditioner, which is in the form of logical pulses of current to the RS232 voltage signals on the personal computer.

It is another object of the circuits described herein to troubleshoot the communication signals between the indoor unit and outdoor unit of an air-conditioner via the conversion circuit.

SUMMARY

A circuit for converting data of a signal line in the form of logical pulses of current to RS 232 level voltages between an air-conditioner and a computer comprising:

a plurality of opto-couplers each having a phototransistor and a photodiode for inverting and electrically isolating the signals received from the signal line of the air conditioner, one or more resistors, a diode for protecting the photodiode against an accidental of reverse voltage, a serial port for receiving an output voltage from the circuit to be connected to the computer, and a light emitting diode for indicating the presence of the signals in the circuit.

A method of configuring a conversion circuit for converting data of a signal line in the form of logical pulses of current to RS 232 level voltages between an air-conditioner and a computer by means of software comprising:

enabling pin 4 [Data Terminal Ready (DTR)] of the serial port as an output positive level voltage, enabling pin 7 [Request To Send (RTS)] of the serial port as an output positive level voltage, and idling pin 3 [Transmitted Data (TXD)] of the serial port as an output negative level voltage.

A method of generating logical '0' by a conversion circuit into positive RS 232 voltage comprising:

turning on the photodiodes in a first opto-coupler and a second opto-coupler wherein the phototransistor in the first opto-coupler will pull a first end of a first resistor to be low, turning off the photodiode in a third opto-coupler wherein the phototransistor in the third opto-coupler will disconnect the negative level voltage at pin 3 from pin 2 of the serial port, and turning on the photodiode in the first opto-coupler and the second opto-coupler wherein the phototransistor in the second opto-coupler will channel the positive level voltage at pin 4 to pin 2 of the serial port.

A method of generating logical '1' by a conversion circuit into negative RS 232 voltage comprising:

turning off the photodiodes in a first opto-coupler and a second opto-coupler wherein the phototransistor in the second opto-coupler will disconnect the positive level voltage at pin 4 from pin 2 of the serial port, turning off of the photodiodes in the first opto-coupler and the second opto-coupler wherein the phototransistor in the first opto-coupler will turn off, and turning on the photodiode in a third opto-coupler wherein the phototransistor in the third opto-coupler will connect the negative level voltage at pin 3 to pin 2 of the serial port.

BRIEF DESCRIPTION OF THE DRAWINGS

FIG. 3 illustrates a waveform of a signal line after its conversion by a converter circuit.

DETAILED DESCRIPTION

Figure 1:
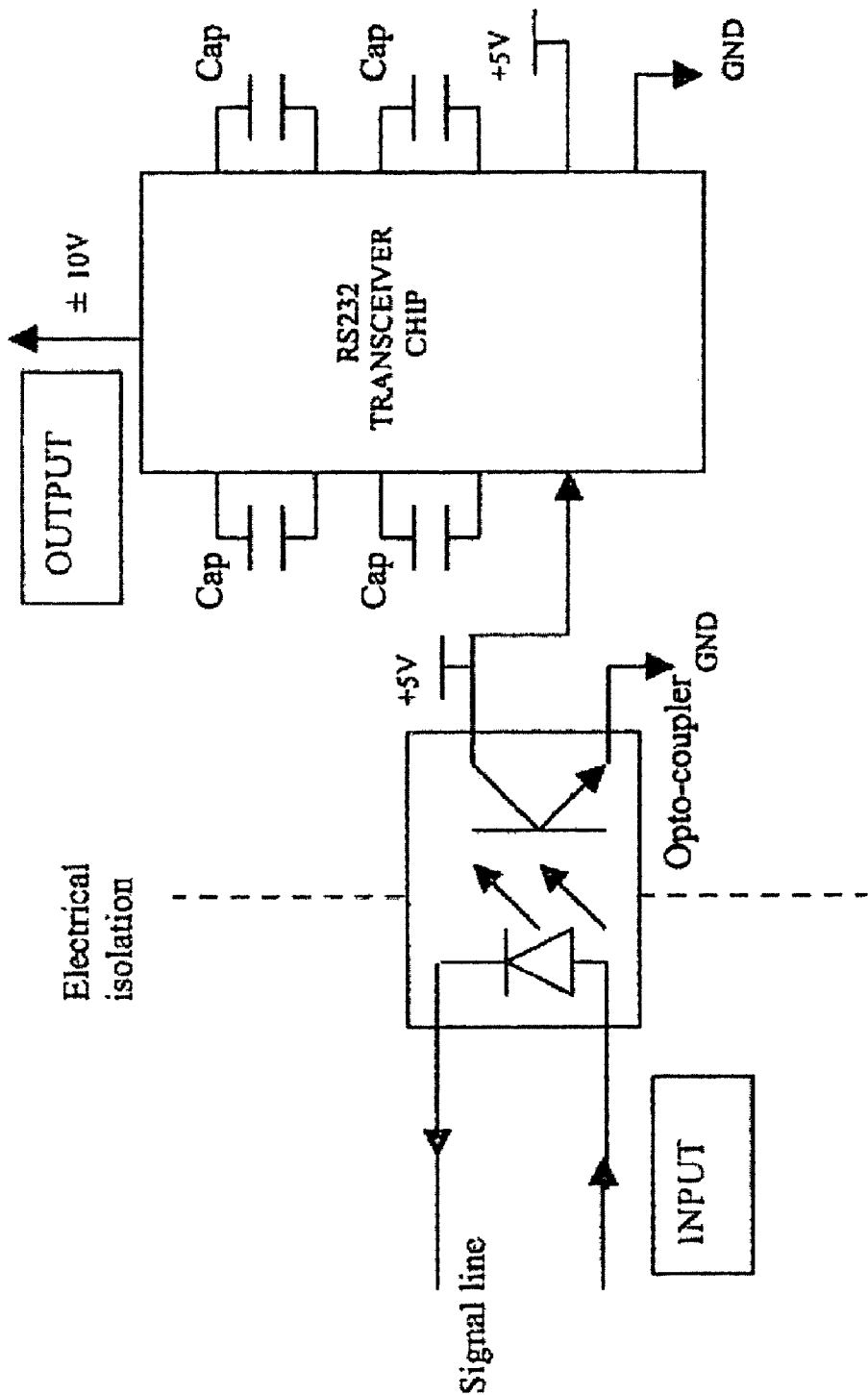
FIG. 1 illustrates a prior art circuit for linking a signal line to an RS 232 port of a computer.
Figure 2:
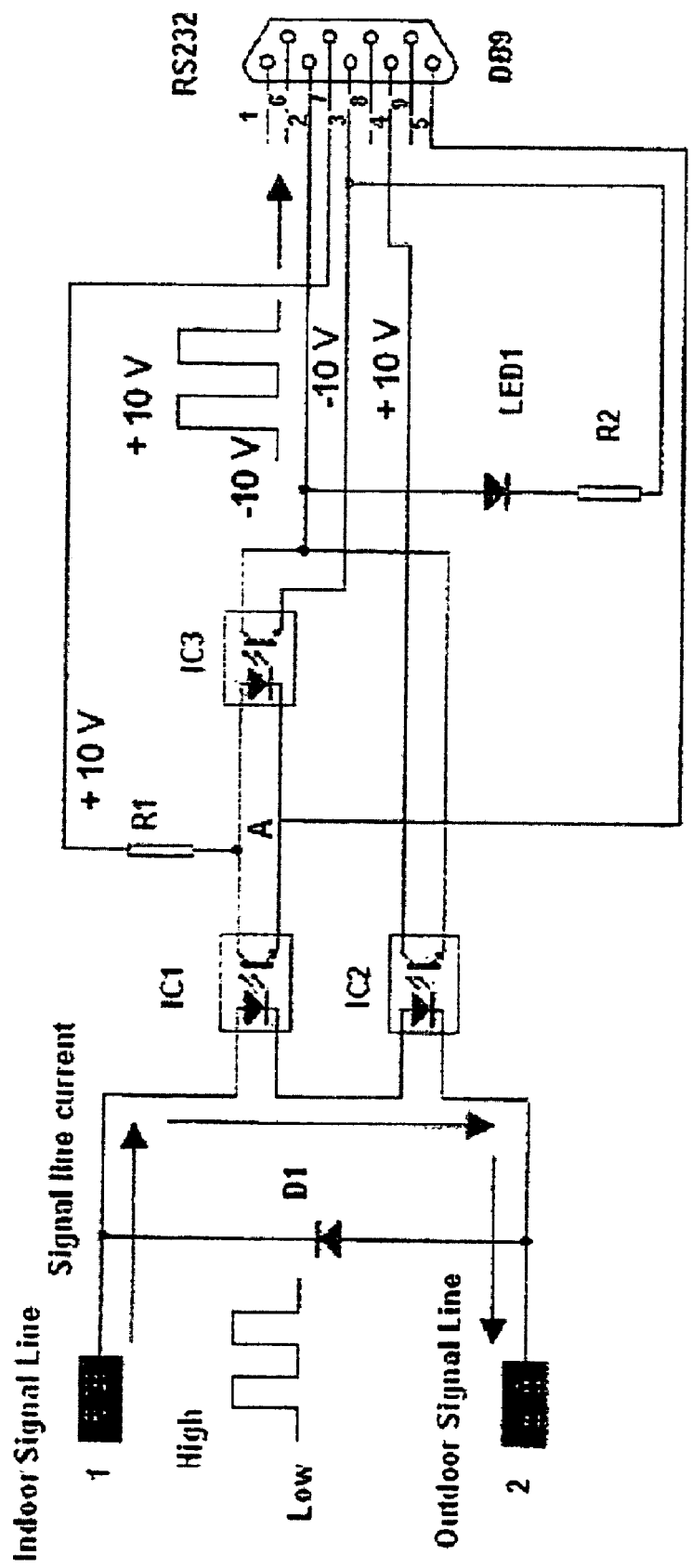
FIG. 2 illustrates a schematic diagram of a converter circuit.

FIG. 2 illustrates a schematic diagram of a converter circuit. The converter circuit includes three opto-couplers, namely IC1, IC2 and IC3, two resistors (R1 and R2), a light emitting diode (LED1), a diode (D1) and RS 232 serial port of a computer. The anode of photodiode of the first opto-coupler IC1 is connected to the indoor signal line while the cathode of the photodiode of the second opto-coupler IC2 is connected to the outdoor signal line. The cathode of the photodiode of the first opto-coupler is in turn, connected to the anode of the photodiode of the second opto-coupler, forming a series connection with a signal line.

The collector of the phototransistor of the first opto-coupler IC1 is configured as an inverter and is connected to the anode of the photodiode of the third opto-coupler IC3 to invert the signal entering IC3. The phototransistor of the second opto-coupler IC2 is configured as a switch, linking pin 4 to pin 2 of the RS232 serial port. The phototransistor in the third opto-coupler IC3 is configured as a switch, linking pin 3 to pin 2 of the RS232 serial port. The first resistor R1 is connected between the collector of the phototransistor in the first opto-coupler and pin 7 of the RS232 serial port as part of the inverting circuit. The emitter of the phototransistor of the first opto-coupler and the cathode of the photodiode of the third opto-coupler are connected to pin 5 of the RS232 serial port. The second resistor R2 and the light emitting diode LED1 are connected in series between pin 2 and pin 3 of the RS232 serial port to function as an indicator for presence of signals. Further, the cathode of diode D1 is connected to the indoor side of the signal line, while its anode is connected to the outdoor side of the signal line.

Two pins of the RS 232 port (DB9) namely 7 and 4 provide positive voltage (+10V) while pin 3 provides negative voltage (−10V). Pin 7 [Request To Send (RTS)] and pin 4 [Data Terminal Ready (DTR)] are enabled by software to obtain positive voltage (+10V) while pin 3 [Transmitted Data (TXD)] is left idle to obtain negative voltage (−10V). Pin 2 [Receive Data (RXD)] is the receive pin of the RS232 port. Pin 5 is the common ground of the RS 232 serial port.

For use, when there is low or no current flow through the signal line, IC3 is turned on linking pin 2 to pin 3. This puts pin 2 at the same potential as pin 3 (−10 V). When a positive pulse (high) is sent through the signal line, IC1 and IC2 are turned on. When IC1 is on, the voltage at point A is pulled low, towards common ground, causing IC3 to turn off. With IC3 off, pin 2 is disconnected from pin 3 (−10 V). At the same time, the turning on of IC2 connects pin 2 to pin 4 (+10V). In this way, the pulses of current flowing through the signal line are converted RS232 voltages. Low pulse is converted to negative voltage, −10 V (logic '1') while high pulse is converted to positive voltage, +10 V (logic '0') as shown in FIG. 3.

D1 is a general-purpose diode connected across the input to protect the photodiodes of IC1 and IC2 against accidental application of reverse voltage. Whenever the signal line is at logic high, LED1 lights up. When data is transmitted though the signal line, LED1 is turned on and off intermittently (blinks).

The converter circuit further uses a passive approach in the RS 232 conversion process compared to the RS 232 transceiver integrated circuit (IC). The converter circuit is formed predominantly of opto-coupler circuits, which interfaces directly with the computer serial port (RS 232). The ±10V to ±5V range of voltages available at the serial port of computers are manipulated by the opto-couplers based on the logical state of the incoming signal line and are channeled back to the receiving pin of the serial port. These opto-couplers also electrically isolate the RS 232 port of the computer from the signal line and allow data to be intercepted without obstructing the current flow of the signal line.

One of the advantages of the converter circuit described herein is that the circuit does not require an external regulated power supply typically +5V, vital in most digital and logic circuits. Further, the converter circuit described herein is able to support and connect to various computer hardware, which may have different RS232 level of voltages. This circuit has the inherent property of electrical isolation between the signal line and the serial port of the computer due to the use of opto-couplers, which will protect RS232 port of the computer from electrical surges.

Finally, while the above discussion and figures describe an embodiment of an interface circuit between an RS 232 device and a dissimilar peripheral, the circuits described herein are not limited to an RS 232 device.

Given the above description and the variety of embodiments described therein, it is intended that the following claims define the scope of the present invention, and that the devices and processes within the scope of these claims and their equivalents be covered hereby.

What is claimed is:

1. A circuit for converting data of a signal line in the form of logical pulses of current to RS232 level voltages between an air-conditioner and a computer comprising:
   a plurality of opto-couplers each having a phototransistor and a photodiode for inverting and electrically isolating the signals received from the signal line of the air conditioner;
   one or more resistors;
   a diode for protecting the photodiode against an accidental of reverse voltage;
   a serial port for receiving an output voltage from the circuit to be connected to the computer; and
   a light emitting diode for indicating the presence of the signals in the circuit.

2. The circuit as claimed in claim 1, wherein the circuit is connected between an indoor unit and an outdoor unit of the air-conditioner and connected to a serial port of said computer.

3. The circuit as claimed in claim 2, wherein the circuit allows the computer to intercept serial data transmitted through a signal line connecting the indoor unit and outdoor unit of the air conditioner for troubleshooting any malfunction in communication between the indoor unit and the outdoor unit of the air-conditioner.

4. The circuit as claimed in claim 1, wherein the opto-couplers include a first opto-coupler, a second opto-coupler, and a third opto-coupler.

5. The circuit as claimed in claim 1, wherein the resistors further include a first resistor and a second resistor.

6. The circuit as claimed in claim 1, wherein the serial port is an RS 232 port having nine pins.

7. The circuit as claimed in claim 1, where the circuit comprising components which are connected as follows:
   an anode of the photodiode in a first opto-coupler is connected electrically to a signal line of an indoor unit;
   a cathode of the photodiode in a second opto-coupler is connected electrically to a signal line of an outdoor unit;
   a cathode of the photodiode in the first opto-coupler is connected electrically to an anode of the photodiode in the second opto-coupler;
   a collector of the phototransistor in the first opto-coupler is connected electrically to a first end of a first resistor;
   an emitter of the phototransistor in the first opto-coupler is connected electrically to pin 5 [Ground (GND)] of a RS232 serial port;
   a second end of the first resistor is connected electrically to pin 7 [Request To Sent (RTS)] of the RS232 serial port;
   an anode of a photodiode in a third opto-coupler is connected electrically to the first end of the first resistor;
   a cathode of the photodiode in the third opto-coupler is connected electrically to pin 5 [Ground (GND)] of the RS232 serial port;

a collector of a phototransistor in the second opto-coupler is connected electrically to pin 4 [Data Terminal Ready (DTR)] of the RS232 serial port;

an emitter of the phototransistor in the second opto-coupler is connected electrically to pin 2 [Request To Sent (RXD) of the RS232 serial port;

a collector of the phototransistor in the third opto-coupler is connected electrically to pin 2 [Receive Data (RXD)] of the RS232 serial port;

an emitter of the phototransistor in the third opto-coupler is connected electrically to pin 3 [Transmit (TXD)] of the RS232 serial port;

an anode of the light emitting diode is connected electrically to pin 2 [Receive Data (RXD)] of the RS232 serial port;

a cathode of the light emitting diode is connected electrically to a first end of a second resistor;

a second end of the second resistor is connected electrically to pin 3 [Transmitted (TXD)] of the RS232 serial port;

a cathode of a diode is connected electrically to the signal line of the indoor unit; and an anode of the diode is connected electrically to the signal line of the outdoor unit.

8. The circuit as claimed in claim 1, wherein the opto-couplers are configured as a switch and connected to the serial port for transmitting the output voltage.

9. The circuit as claimed in claim 1, wherein the logical pulses are converted to a negative RS 232 voltage when the pulse is low at logical '1' and a positive RS 232 voltage when the pulse is high at logical '0'.

10. A method of generating a logical '0' by a circuit as claimed in claim 1 into positive RS232 voltage comprising:

turning on the photodiodes in a first opto-coupler and a second opto-coupler wherein the phototransistor in the first opto-coupler will pull the first end of a first resistor to be low voltage ;

turning off the photodiode in a third opto-coupler wherein the phototransistor in the third opto-coupler will disconnect the negative level voltage at pin 3 from pin 2 of the serial port; and turning on the photodiode in the first opto-coupler and the second opto-coupler wherein the phototransistor in the second opto-coupler will channel the positive level voltage at pin 4 to pin 2 of the serial port.

11. A method of generating logical '1' by a circuit as claimed in claim 1 into negative RS 232 voltage comprising:

turning off the photodiodes in a first opto-coupler and a second opto-coupler wherein the phototransistor in the second opto-coupler will disconnect the positive level voltage at pin 4 from pin 2 of the serial port;

turning off of the photodiodes in the first opto-coupler and the second opto-coupler wherein the phototransistor in the first opto-coupler will turn off; and turning on the photodiode in a third opto-coupler wherein the phototransistor in the third opto-coupler will connect the negative level voltage at pin 3 to pin 2 of the serial port.

12. A method of configuring a circuit as claimed in claim 1 for converting data of the signal line in the form of logical pulses of current to RS 232 level voltages between an air conditioner and a computer by means of software comprising:

enabling pin 4 [Data Terminal Ready (DTR)] of the serial port as an output positive level voltage;

enabling pin 7 [Request To Send (RTS)] of the serial port as an output positive level voltage; and idling pin 3 [Transmitted Data (TXD)] of the serial port as an output negative level voltage.

13. The method as claimed in claim 1, wherein the serial port is a RS232 serial port.

* * * * *

UNITED STATES PATENT AND TRADEMARK OFFICE
CERTIFICATE OF CORRECTION

| | | |
|---|---|---|
| PATENT NO. | : 8,097,841 B2 | |
| APPLICATION NO. | : 12/045983 | |
| DATED | : January 17, 2012 | |
| INVENTOR(S) | : Keen Yong Walter Loh | |

It is certified that error appears in the above-identified patent and that said Letters Patent is hereby corrected as shown below:

In Claim 7, Line 62, Column 4, delete "Sent" and insert -- Send --, therefor.

In Claim 7, Line 5-6, Column 5, delete "Request to Sent (RXD)" and insert -- Receive Data (RXD)] --, therefor.

In Claim 10, Line 36, Column 5, delete "voltage ;" and insert -- voltage; --, therefor.

In Claim 11, Line 9, Column 6, delete "generating" and insert -- generating a --, therefor.

Signed and Sealed this
First Day of May, 2012

David J. Kappos
*Director of the United States Patent and Trademark Office*